United States Patent
Bent et al.

(10) Patent No.: US 12,133,539 B2
(45) Date of Patent: Nov. 5, 2024

(54) FROZEN CONFECTION

(71) Applicant: Conopco, Inc., Englewood Cliffs, NJ (US)

(72) Inventors: Julian Francis Bent, Bedford (GB); William James Frith, Leighton Buzzard (GB)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 17/440,237

(22) PCT Filed: Feb. 27, 2020

(86) PCT No.: PCT/EP2020/055159
§ 371 (c)(1),
(2) Date: Sep. 17, 2021

(87) PCT Pub. No.: WO2020/187544
PCT Pub. Date: Sep. 24, 2020

(65) Prior Publication Data
US 2022/0151257 A1    May 19, 2022

(30) Foreign Application Priority Data
Mar. 19, 2019  (EP) .................................... 19163668

(51) Int. Cl.
*A23G 9/32*    (2006.01)
*A23G 9/34*    (2006.01)
*A23G 9/38*    (2006.01)

(52) U.S. Cl.
CPC ............... *A23G 9/327* (2013.01); *A23G 9/34* (2013.01); *A23G 9/38* (2013.01); *A23G 2200/14* (2013.01)

(58) Field of Classification Search
CPC ..................................................... A23G 9/327
See application file for complete search history.

(56) References Cited

U.S. PATENT DOCUMENTS

| | | | |
|---|---|---|---|
| 3,971,856 | A | 7/1976 | Daftary |
| 4,025,658 | A | 5/1977 | Pominski et al. |
| 4,088,795 | A | 5/1978 | Goodnight, Jr. et al. |
| 4,362,759 | A | 12/1982 | Harris |
| 6,146,645 | A | 11/2000 | Deckers |

(Continued)

FOREIGN PATENT DOCUMENTS

| | | |
|---|---|---|
| CA | 2290278 | 5/2001 |
| CN | 102406041 | 4/2012 |
| CN | 105802725 | 7/2016 |

(Continued)

OTHER PUBLICATIONS

"Physical Properties of Fats and Oils", taken from various publications dated 1992-2006, pp. 1-29. (Year: 2006).*

(Continued)

*Primary Examiner* — Jenna A Watts
(74) *Attorney, Agent, or Firm* — Gerard J. McGowan, Jr.

(57) ABSTRACT

The invention provides a frozen confection product comprising oil bodies and from 2 to 35 wt % total fat; at most 15 wt % protein; and from 5 to 40 wt % sugars; wherein at least 25 wt % of the fat is present as oil bodies; and wherein the oil in the oil bodies has an iodine value of less than 100 and comprises at least 45% C18:1 fatty acids.

10 Claims, 1 Drawing Sheet

(56) References Cited

U.S. PATENT DOCUMENTS 6,383,550 B1     5/2002     Juillerat et al.

FOREIGN PATENT DOCUMENTS

| CN | 106929147 | | 7/2017 | |
|---|---|---|---|---|
| CN | 107125430 | | 9/2017 | |
| EP | 0883997 | | 12/1998 | |
| EP | 1007554 | | 3/2006 | |
| EP | 1952695 | | 8/2018 | |
| WO | WO9853698 | | 12/1998 | |
| WO | WO0195934 | | 12/2001 | |
| WO | WO2005013713 | | 2/2005 | |
| WO | WO-2005013713 | A1 * | 2/2005 | ............ A23G 9/327 |
| WO | WO2006042608 | | 4/2006 | |
| WO | WO2007115899 | | 10/2007 | |
| WO | WO2010009499 | | 1/2010 | |
| WO | WO2012106751 | | 8/2012 | |
| WO | WO2012110797 | | 8/2012 | |
| WO | WO2013158938 | | 10/2013 | |
| WO | WO2013159149 | | 10/2013 | |
| WO | WO2014154780 | | 10/2014 | |
| WO | WO2017066569 | | 4/2017 | |

OTHER PUBLICATIONS

"Avocado Oil—an Overview". Gourmet and Health-Promoting Specialty Oils, https://www.sciencedirect.com/topics/agricultural-and-biological-science/avocado-oil. Published 2009, pp. 1-11. (Year: 2009).*

1st International Conference on Oil Bodies, http://www.oilbodyconference2018.org; Oct. 2018.

Aguilar et al., Rheological Behavior of Processed Mustard. I: Effect of Milling Treatment, Journal of Texture studies, 22:59-84; Dec. 5, 1990.

Alamprese et al., "Survival of Lactobacillus johnsonii La1 and influence of its addition in retail- manufactured ice cream produced with different sugar and fat concentrations", International Dairy Journal 2: 201-208; Sep. 26, 2001.

Eder, "Gas chromatographic analysis of fatty acid methyl esters", J. Chromatogr. B Biomed. Sci. Appl. 671(1-2):113-131; Sep. 15, 1995.

IPRP in PCTEP2020055159; Sep. 30, 2021.

Jacks et al., Isolation and Physicochemcal Characterization of the Half-Unit Membranes of Oilseed Lipid Bodies, JAOCS 67: 353-361; Jun. 1990.

Leber et al., "Characterization of Lipid Particles of the Yeast", Yeast 10: 1421-1428); Jun. 6, 1994.

Napier et al., "The Seed Oleosins: Structure, Properties and Biological Role", Adv. Bot. Res. 35: 111-138; 2001.

Nikiforidis et al., "Composition, properties and potential food applications of natural emulsions and cream materials based on oil bodies", RSC Adv., 4, p. 25067-25078; May 14, 2014.

Pieper-Furst et al., "Purification and Characterization of a 14-Kilodalton Protein That is Bound to the Surface of Polyhydroxyalkanoic Acid Granules in Rhodococcus ruber", J. Bacterid. 176(14):4328; May 1994.

Roessler, "Effects of Silicon Deficiency On Lipid Composition And Metabolism In The Diatom Cyclotella Cryptica1", J. Physiol. 24(3): 394-400; Mar. 2008.

Roland et al., "Effects of fat content on the sensory properties, melting, color, and hardness of ice cream" Journal of Dairy Science 82(1): 32-38; Jan. 1999.

Search Report and Written Opinion in EP19163668.7, dated Aug. 30, 2019.

Search Report and Written Opinion in PCTEP2020055159, dated May 18, 2020.

Sofjan et al., "Effects of overrun on structural and physical characteristics of ice cream" International Dairy Journal 14(3): 255-262; Mar. 2004.

Ting et al., "Oleosin of Plant Seed Oil Bodies Is Correctly Targeted to the Lipid Bodies in Transformed Yeast", J. Biol Chem. 272(6): 3699-3706; Feb. 1997.

Third Party Observation in EP20200706516; Nov. 3, 2023.

Yumna; Avocado Ice Cream; https://feelgoodfoodie.net/recipe/avocado-ice-cream/; Jun. 6, 2018.

Oliver; Avocado Ice Cream; https://www.jamieoliver.com/recipes/fruit-recipes/avocado-ice-cream/; Aug. 23, 2018.

Smorynski; Avocado Ice Cream; https://www.rachaelrayshow.com/recipes/21115_avocado_ice_cream; Dec. 2, 2015.

Tesco Real Food; How to make avocado ice cream; https://realfood.tesco.com/step-by-step/how-to-make-avocado-ice-cream.html; Jun. 12, 2018.

Andrews; Vegan Avocado Ice Cream; https://lovingitvegan.com/vegan-avocado-ice-creamT/; Feb. 19, 2019.

Mesquita; Avocado Ice Cream; https://www.oliviascuisine.com/avocado-ice-cream/; May 20, 2015.

Gerson; Avocado Ice Cream (Helado de Aguacate); https://food52.com/recipes/72661-avocado-ice-cream-helado-de-aguacate; Aug. 18, 2017.

Cado Ice Cream; Dairy Free Ice Cream Made From Avocado; https://cadoicecream.com/; May 13, 2018.

Cado; Cado Ice Cream; https://web.archive.org/web/20160110030542/http://cadoicecream.com/; Retrieved Nov. 14, 2023.

Cado Ice Cream; The First Avocado Ice Cream; https://web.archive.org/web/20150801043209/http://www.cadoicecream.com/; Retrieved Nov. 14, 2023.

Sung et al.; Effect of Solid Fat Content on Structure in Ice Creams Containing Palm Kernel Oil and High-Oleic Sunflower Oil; Journal of Food Science; Apr. 2010; pp. C274-C279; vol. 75.

Zulim Botega et al.; The Potential Application of Rice Bran Wax Oleogel to Replace Solid Fat and Enhance Unsaturated Fat Content in Ice Cream; Journal of Food Science; Sep. 2013; pp. C1334-C1339; vol. 78.

Platt et al.; Ultrastructure of the Mesocarp of Mature Avocado Fruit and Changes Associated with Ripening; Annals of Botany; Oct. 1981; vol. 48; pp. 451-466; Abstract only.

* cited by examiner

FROZEN CONFECTION

FIELD OF THE INVENTION

The present invention relates to frozen confections such as ice cream with improved meltdown properties, in particular it relates to frozen confections with improved meltdown properties due to the presence of oil bodies having specific properties.

BACKGROUND OF THE INVENTION

Frozen confection manufacture, such as that for ice cream, typically involves the steps of: premix preparation; pasteurization and homogenization; ageing; freezing; and hardening.

The first step is the preparation of the premix. The mixing process is designed to blend together, disperse and hydrate the ingredients in the minimum time with optimal energy usage. The premix is then pasteurized to reduce the number of viable micro-organisms to a level that is safe for human consumption, and homogenized to break any fat particles down into small droplets. In the homogenizer the hot premix (>70° C.) is forced through a small valve under high pressure. Large fat droplets are elongated and broken up into a fine emulsion of much smaller droplets, greatly increasing the surface area. A second homogenization step may be used with a lower pressure to reduce clustering of the small fat droplets after the first stage. Pasteurization may also take place in the holding tube, a length of pipe from the homogenizer outlet whose length and diameter are chosen to ensure that the mix is held at the pasteurizing temperature for the required time. A typical pasteurization regime is a temperature of about 80.5° C. and a holding time of about 30 s.

After pasteurization the premix is cooled then aged, during which emulsifiers adsorb to the surface of any fat droplets and any fat inside the droplets begins to crystallize. Fat crystals may protrude through the droplet surface and so the ageing is long enough for crystallization to occur and for emulsifiers to displace some of the protein, since both of these processes are important precursors to the next stage in ice cream production.

Freezing typically occurs using scraped surface heat exchangers designed to remove heat from the viscous liquid of the premix. Refrigerant flows through a jacket and cools the outside of the barrel as it evaporates. Inside the barrel is a rotating dasher driven by a motor. The dasher is equipped with scraper blades that fit closely inside the barrel. The dasher subjects the premix to high shear and scrapes off the layer of ice crystals that forms on the barrel wall. The mix at approximately 4° C. is pumped from the ageing tank into the freezer, where it is aerated and frozen before being pumped out from the other end. Air can be injected into the barrel of the freezer where it initially forms large bubbles.

Whilst the mix is aerated, it is simultaneously frozen. Heat must be extracted from the mix both to cool it down (the sensible heat) and to freeze water into ice (the latent heat). The frozen mix is extruded from the freezer at a temperature of approximately −5° C. After extrusion, the temperature of the product is lowered as quickly as possible after it leaves the freezer. This is known as hardening. Products are usually hardened in a hardening tunnel, an enclosed chamber into which the frozen confections pass on a conveyor belt from the freezer. Inside, cold air (typically −30 to −45° C.) is blown over the products which are then stored in cold stores at about −25° C. before being distributed in a cold chain at approximately the same temperature before storage at the point of sale in freezers at approximately −18° C.

It can therefore be appreciated that the formulation and processing of frozen confections such as ice cream is carefully controlled in order to arrive at a product with the appropriate microstructure and the required organoleptic properties and product attributes such taste, texture, firmness, and so on.

It will also be readily appreciated that the cold storage (approximately −18° C.) of frozen confections such as ice cream is essential to maintain the quality of the product. However, there are many stages in the lifecycle of frozen confection products where the temperature can be elevated above the required cold storage conditions. For example, when products are distributed from the point of manufacture to the point of sale they are transitioned from the factory cold store (at the point of manufacture) to a delivery vehicle and then from the delivery vehicle to storage locations. These storage locations can include intermediate distribution warehouses and storage freezers within a retail outlet (e.g. storage freezers in a shop or supermarket). Products can then be transferred from the retail storage location to the point of sale (e.g. display freezers or vending machines). At each of these stages of transfer from one cold store to another, the product can experience temperature elevation. In addition, one of the most significant periods of temperature elevation occurs when products are taken from the point of sale, purchased, and then transported to a consumer's home freezer. Under these conditions the frozen confections can spend from about 15 minutes to over an hour at ambient temperatures. Moreover, there is also the consumption period of the products themselves during which the frozen confections are at ambient temperatures while being eaten. At all these stages of high temperature, frozen confection products can and do suffer from significant degradation, in particular they suffer from meltdown.

The meltdown behaviour of frozen confections reflects their ability to resist melting when exposed to elevated temperatures for a period of time. Unlike other thermal properties, meltdown is not a uniquely defined standard physical parameter. It is an empirical measure that reflects a number of factors including thermal conductivity, heat capacity, microstructure and formulation. Meltdown is therefore an important measure of the ability of ice cream to withstand temperature rises.

Meltdown is caused by the loss of the structure in a frozen confection as the temperature rises and hence any structure supported by the presence of ice in the frozen product is lost as the ice crystals are lost, the product collapses, and it ultimately melts.

There are many approaches to improving meltdown, such as those listed below.

Sugars

Meltdown can be improved by using lower levels of sugar (i.e. freezing point depressors) to provide more ice and higher melting temperatures. However, the removal of freezing point depressors can impact the organoleptic properties of the products for example by reducing sweetness and increasing iciness.

Stabilizers

Another route for improving meltdown is the use of stabilizers which are a group of water-soluble or water-dispersible biopolymers used in small amounts in ice cream, sorbets, water ices and other foods. Most stabilizers are polysaccharides of plant origin, e.g. alginates and carrageenans (from seaweeds), locust bean gum and guar gum (from tree seeds), pectin (from fruit) and sodium carboxymethyl cellulose (from wool or cotton).

Xanthan, a bacterial polysaccharide, and gelatin, a polypeptide of animal origin, are also sometimes used. Although they come from natural sources, under European law they are considered food additives and therefore they have associated "E-numbers" which are not acceptable to most consumers. Therefore, it would be preferred if alternative means to improve meltdown could be found.

Air Phase

The presence of air in a product can also impact meltdown because air cells act as an insulator and slow the ability of heat to penetrate into the ice cream and melt the ice crystals, thus reducing the rate of meltdown (Sofjan & Hartel, 2003 "Effects of overrun on structural and physical characteristics of ice cream" *International Dairy Journal* 14: 255-262). It has further been found that ice creams with low overruns melt quickly, whereas ice creams with high overruns melt slowly and have a good melting resistance (Sakurai et al., 1996 "Effect of production conditions on ice cream melting resistance and hardness" *Milchwissenschaft* 51(8): 451-454).

Fat

Elevated levels of fat can also cause reductions in meltdown. A study investigated ice creams formulated with different percentages of fat and showed melting rate decreased with high fat content (Roland et al., 1999 "Effects of fat content on the sensory properties, melting, color, and hardness of ice cream" *Journal of Dairy Science* 82: 32-38). A further study demonstrated that ice cream with higher fat content is softer and shows a slower melting rate (Alamprese et al., 2002 "Survival of *Lactobacillus johnsonii* La1 and influence of its addition in retail-manufactured ice cream produced with different sugar and fat concentrations" *International Dairy Journal* 2: 201-208). Elevated fat levels may therefore improve meltdown, but will also have a detrimental impact on the nutritional profile of products.

Emulsifiers

The fat undergoes partial coalescence, or destabilisation, during dynamic freezing wherein a protruding fat crystal from one fat globule pierces the interfacial film of another globule, forming a connection between the internal phases of the globules. The partially coalesced globules are crucial for the development of smooth texture and resistance to meltdown and the rate of meltdown generally decreases as the extent of fat destabilisation increases. Emulsifiers (e.g. monoglycerides, diglycerides, or polysorbate 80) promote partial coalescence by displacing adsorbed proteins from the fat interface. For example, studies have shown that the addition of polysorbate 80 to ice cream (at levels of 0.02% and above) has been shown to greatly decrease the melting rate of ice cream and to promote shape retention (Campbell & Pelan "The influence of emulsion stability on the properties of ice cream" pages 25-36 in Ice Cream: Proceedings of the International Symposium held in Athens, Greece, 18-19 Sep. 1997, International Dairy Federation, Brussels, Belgium). However, emulsifiers face the same issue as stabilizers because they must be listed on pack as an ingredient, often carry an "E-number", and are therefore often deemed a sub-optimal, unnatural, or unacceptable ingredient by consumers.

SUMMARY

It can therefore be appreciated that there are many different approaches to improving meltdown such as those detailed above, but it is also apparent that they each suffer from one or more drawbacks. We note that none of these approaches make any mention of the use of oil bodies.

Oil Bodies

Oil bodies (also known as oleosomes, lipid bodies, or spherosomes) are pre-emulsified droplets or vesicles of oil stored in plant seeds and are used as an energy source for plant growth and metabolism. The oil vesicles are stabilised by a layer containing phospholipids and various proteins associated with the oleosomes generically called "intrinsic proteins", said intrinsic proteins containing mostly oleosins. The oleosins contain a hydrophilic part, which is present at the oleosome's surface and a hydrophobic part which is anchored in the oil and ensures for oleosome stability. The oil contained by the oil bodies contains a mixture of triglycerides of which the exact composition depends on the specific plant species from which the oil is derived. It is possible through either classical breeding, mutation, or genetic engineering techniques to manipulate the oil profile of seeds and expand on the naturally available repertoire of plant oil compositions.

Oil bodies are typically extracted from seeds by a process involving grinding the hydrated seeds, washing, filtering and dispersing the ground seeds to form an aqueous suspension, and centrifuging said suspension to separate the oil bodies. The separated oil bodies are skimmed and recovered and eventually washed or purified to remove non-oil body associated proteins (generically called "extrinsic proteins"), allergens, undesirable odours, flavours, colours and other unwanted contaminants. Methods for the extraction of oil bodies from a range of plant seeds are known in the art. For example, Deckers et al. (U.S. Pat. No. 6,146,645) concerns the extraction of oil bodies from plant seeds, for example sunflower seeds, and the use of oil bodies in a range of industries including the food industry. Ice cream compositions are said to be a possible end use for the oil bodies so produced, but no further details are provided, and meltdown is not mentioned. The contents of this document, particularly in as far they relate to the detection, nature of, preparation, and processing of oil bodies are specifically incorporated herein by reference.

Wakabayashi et al. (EP 0 883 997) discusses the extraction of lipid/protein complexes (oil bodies) from seeds. Again, the contents of this document, particularly in as far they relate to the detection, nature of, preparation and processing of oil bodies are specifically incorporated herein by reference.

Methods for the extraction of lipid/protein isolates from a range of other plant sources and their use in ice confections are also known in the art. It is possible that some of these extracts or isolates contain oil bodies. For example, Juillerat et al. (U.S. Pat. No. 6,383,550) discloses the extraction of lipid and protein extracts from fruit kernels and their use in food products such as ice cream. It is possible that this extract would contain oil bodies. However, the extract described therein has a lipid/protein ratio of 0.05 to 3.5. Only one example of an ice cream product is described (example 7). Meltdown is not mentioned.

Goodnight Jr et al. (U.S. Pat. No. 4,088,795) discloses the removal of soluble carbohydrate from an oil seed-lipid containing emulsion in order that the emulsion, when used in food products, is more easily digested. Meltdown is not mentioned.

Debron et al. (WO 2017/066569) relates to a composition containing oleosomes and its applications thereof, in particular in food, pharmaceutical and personal care products. Examples of food products include iced products such as ice cream, soft cream, lacto-ice, ice milk, sherbet, frozen yogurt, etc. The application asserts that the or emulsion may be employed to prepare ice creams, milkshakes or other frozen food-grade materials with improved freezing properties by inhibiting or preventing ice crystal formation. Meltdown is not mentioned but the application suggests that the oleosomes would prevent ice crystal formation, which will reduce ice levels and deleteriously impact meltdown.

Berry et al. (WO 2005/013713) relates to ice confections and their manufacturing process, in particular to low cost ice confections which contain oil bodies. The application teaches that the products of the invention typically have a low total solids content, and provide health benefits as oil bodies typically comprise polyunsaturated oils, such as are found for example in sunflower oil, which are healthier than the saturated fats often used in frozen confectionery products. It therefore teaches that oil bodies comprise polyunsaturated oils and makes no mention of meltdown.

Berry et al. (WO 2006/042608) relates to ice confections, in particular to healthy ice confections which contain oil bodies. It discloses a need for ice confections which contain polyunsaturated fats but which do not suffer from the drawbacks of poor aeration or the need for additives and suggests that the use of oil bodies in ice confection products can provide this. It teaches oil bodies comprising polyunsaturated oils. Meltdown results for 5 percent oil body samples with and without emulsifier are provided.

As set out above, there is a need for frozen confections having an improved meltdown. As also set out above, the use of oil bodies in ice creams is known, but their use has not been disclosed in the context of improving meltdown.

The present inventors have found that meltdown can be improved if oil bodies having a specific type of oil are used.

SUMMARY OF THE INVENTION

Accordingly, in a first aspect the present invention provides a frozen confection product comprising oil bodies and
from 2 to 35 wt % total fat;
at most 15 wt % protein; and
from 5 to 40 wt % sugars;
wherein at least 25 wt % of the fat is present as oil bodies; and wherein the oil in the oil bodies has an iodine value of less than 100 and comprise at least 45 wt % C18:1 fatty acids.

Preferably the frozen confection is an ice cream, water ice, frozen yoghurt, or sorbet. Most preferably the frozen confection is an ice cream.

In a second aspect the present invention provides a premix for preparing the frozen confection of the first aspect of the invention. Preferably the premix is an ice cream premix.

In a third aspect, the present invention provides a process for the preparation of the product of the first aspect by combining the ingredients to make the premix of the second aspect and freezing the premix.

DETAILED DESCRIPTION OF THE INVENTION

The present invention provides a frozen confection product comprising oil bodies and
from 2 to 35 wt % total fat;
at most 15 wt % protein; and
from 5 to 40 wt % sugars;
wherein at least 25 wt % of the fat is present as oil bodies; and wherein the oil in the oil bodies has an iodine value of less than 100 and comprises at least 45 wt % C18:1 fatty acids.

Frozen Confection

By "frozen confection" is meant an edible confection made by freezing a mix of ingredients, which include water. Frozen confections typically contain fat, non-fat milk solids and freezing point depressors (typically sugars), together with other minor ingredients such as stabilisers, emulsifiers, colours and flavourings. Preferred frozen confections include ice cream, water ice, frozen yoghurt, sorbet and the like. Preferably the frozen confection is an ice cream. By "aerated" frozen confection is meant a frozen confection that has deliberately had gas incorporated into it.

Total Fat

The frozen confection product comprises from 2 to 35 wt % (by weight of the product) total fat. In the context of the present invention, total fat means the total amount of fat in the frozen confection as calculated from the fat or the oil in the oil bodies and also fat from other fat-containing ingredients used in ice creams, such dairy fat, coconut oil, palm oil and sunflower oil.

Preferably the frozen confection product comprises at most 32.5 wt % total fat, at most 30 wt %, at most 27.5 wt %, at most 25 wt %, at most 22.5 wt %, at most 20 wt %, or even at most 17.5 wt % total fat.

Preferably the frozen confection product comprises at least 3 wt % total fat, at least 4 wt %, at least 5 wt %, at least 6 wt %, at least 7.5 wt %, at least 10 wt %, at least 12.5 wt %, or even at least 15 wt % total fat.

Protein

The frozen confection product comprises at most 15 wt % (by weight of the product) protein. Proteins which may be present in the ice confection (in addition to oleosin proteins) include milk proteins, legume protein (such as pea protein, chick pea protein, lentil protein, lupin protein, soy protein), wheat protein, barley protein and mixtures thereof. Particularly preferred are milk proteins owing to their superior flavour, heat stability and surface activity. Suitable sources of milk protein include milk, concentrated milk, milk powders, whey, whey powders and whey protein concentrates/isolates. In the context of the present invention the level of protein does not include protein present from the oil bodies or the oil body preparations (such as oleosin or cell wall material/storage protein from the seeds).

Preferably the frozen confection product comprises at most 12.5 wt % (by weight of the product) of protein, preferably at most 10 wt %, at most 7.5 wt %, at most 5 wt %, at most 4 wt %, at most 3 wt %, at most 2 wt %, at most 1 wt %, at most 0.5 wt %, at most 0.25 wt %, at most 0.1 wt %, at most 0.05 wt %, or even at most 0.025 wt % protein. Preferably the frozen confection product comprises no protein.

Where the frozen confection product comprises protein, it preferably comprises the protein in an amount of at least 0.1 wt %, at least 0.5 wt %, at least 1 wt %, or even at least 2 wt %.

Sugars

The frozen confection product comprises from 5 to 40 wt % (by weight of the product) sugars. The sugars is typically consist of mono-, di-, or oligo-saccharides (for instance, sucrose, dextrose, fructose, lactose, lactose monohydrate, glucose syrup, invert sugar, corn syrup) or sugar alcohols (for example, erythritol, arabitol, xylitol, sorbitol, glycerol, mannitol, lactitol, maltitol), or mixtures thereof. Preferably the sugars consist of mono-saccharides and di-saccharides, more preferably the sugars consist of mono-saccharides only.

Preferably the frozen confection product comprises at most 37.5 wt % (by weight of the product) sugars, at most 35 wt %, at most 32.5 wt %, at most 30 wt %, at most 27.5 wt %, or even at most 25 wt % sugars.

Preferably the frozen confection product comprises at least 7.5 wt % (by weight of the product) sugars, at least 10 wt %, at least 12.5 wt %, at least 15 wt %, at least 17.5 wt %, at least 20 wt %, or even at least 22.5 wt % sugars.

The present invention is also suitable for low sugar formulations and therefore in a further aspect the frozen confection product comprises at most 5 wt % (by weight of the product) sugars, at most 4 wt %, at most 3 wt %, at most 2 wt %, at most 1 wt %, most preferably no sugars.

Oil Bodies

As used herein oil bodies are pre-emulsified droplets or vesicles of oil stored in plant seeds. The droplets are stabilised by a layer containing phospholipids and various proteins associated with the oleosomes generically called "intrinsic proteins", said intrinsic proteins containing mostly oleosins. The oil contained by the oil bodies contains a mixture of triglycerides of which the exact composition depends on the specific plant species from which the oil is derived. The term "oil body" as used herein therefore refers to the lipid-oleosin protein complex. The term oil body does not include the oil droplets in conventional ice cream emulsions in which the fat is emulsified with emulsifiers and/or proteins (such as mono-/di-glycerides and milk proteins) that are not present in the seeds.

The term "oil body preparation" as used herein refers to the product of a process of extraction of intact oil bodies from a natural source, as in the Examples below. The terms oil body and oil body preparation do not include the seeds per se.

Oil Bodies—Sources

The sources of origin for the oleosomes used in the present invention may be any cells containing oleosomes or oleosomes-like organelles. This includes animal cells, plant cells, fungal cells, yeast cells, bacterial cells and algae cells. In preferred embodiments of the invention the oleosomes are obtained from a plant cell which includes cells from pollens, spores, seed and vegetative plant organs in which oleosomes or oleosomes-like organelles are present. Preferably, the oleosomes are obtained from a plant seed.

Preferably the oil bodies are derived from a source selected from the group consisting of the seeds of sunflower, rapeseed, soybean, oil palm, cotton seed, ground nut, castor, safflower, mustard, coriander, squash, linseed, brazil nut, jojoba, maize, sesame, chick pea, avocado, pumpkin, or winged bean; or from avocado fruit, or any mixture thereof. More preferably the oil bodies are derived from a source selected from the group consisting of the seeds of sunflower, soybean, avocado, pumpkin, winged bean or rapeseed, or from avocado fruit, or any mixture thereof. Most preferably the oil bodies are derived from sunflower seeds.

Oil bodies other than those derived from plants may also be used in the present invention. A system functionally equivalent to plant oleosomes and oleosins has been described in bacteria (Pieper-Fiirst et al., 1994, *J. Bacterid.* 176: 4328), yeast (Leber et al., 1994, *Yeast* 10: 1421-1428), algae (Rossler, 1988, *J. Physiol.* 24: 394-400) and fungi (Ting et al., 1997, *J. Biol Chem.* 272: 3699-3706). Oil bodies from these organisms may also be employed in the present invention.

Detection of Oil Bodies

The presence of oil bodies is detected in frozen confections by the presence of oleosin protein (which is usually not present in refined fats such as sunflower oil). The presence of sunflower oil may be detected by the presence of triacylglycerols and other characteristic components.

Detection of Oleosin by Amino Acid Sequencing

Amino acid sequences for oleosins from sunflower seeds and other oil seeds have been published and are available through sequence databases such as SwissProt and PIR. Examples of sunflower seed oleosin sequences include the following accession numbers: SwissProt P29529 and PIR S70453. The sequences of oleosins from different species are related, in particular the central, hydrophobic domain is the region most conserved between species (Napier et al., 2001, *Adv. Bot. Res.* 35: 111-138). Therefore, the oleosin protein can be identified by amino acid sequencing. Fragments of amino acid sequence obtained from the product (as described below) are compared with the published sequences using database searching and sequence comparison facilities that are well-known in the art, such as ExPasy or SRS. If the stretches of sequence from the product closely match a published sequence, it indicates that oleosin from that oil seed is present in the product.

The protein component of a frozen confection product is separated from the other ingredients as follows:

In order to extract intact oil bodies from the ice cream, 1-2 g of the confection is placed in an Eppendorf tube and allowed to melt. The sample is then centrifuged at 13,500 rpm for 5 minutes. The resulting 'fat pad' on the surface of the sample is transferred into a fresh Eppendorf tube.

In order to remove non-oleosin proteins (such as sunflower seed proteins and milk proteins) the sample is washed with urea. 1 ml of 9 M urea is added to the fat pad, mixed by vortexing thoroughly and incubated in the fridge for 2 hours. The sample is then centrifuged and the fat pad is skimmed off. Two further urea washes are performed.

In order to remove the fat from the intact oil bodies and to precipitate the oleosins, 1 ml of acetone chilled to −25° C. is added to the fat pad, and the sample is incubated on ice for 1 hour. The sample is then centrifuged at 13500 rpm. The precipitate is retained and the supernatant is discarded. Two further washes with chilled acetone are then carried out and the pellet is left to air-dry overnight.

In order to prepare the sample for SDS-PAGE (Polyacrylamide gel electrophoresis), 0.001 g of the dry powder is re-solubilised in 0.5 ml sample buffer, and incubated at room temperature for 30 minutes. The sample reducing agent is then added and the sample is boiled for 2 minutes. The sample can then be run on SDS-PAGE alongside molecular weight standards, and the protein bands visualised with a stain such as Coomassie blue. 25 µl of the oleosin sample solution is loaded into to each of 8 wells of a 10% bis-tris NuPAGE gel. The gel is then run using MES running buffer. Using this procedure, two oleosin protein bands are typically seen. These bands correspond to the two oleosin isomers (approximate molecular weights 19.5 kD and 20.5 kD).

As the oleosin proteins are blocked to N-terminal sequencing, the protein bands are digested using an in-gel digestion technique and a suitable proteolytic enzyme such as trypsin or endoproteinase Lys-C. The protein fragments are then separated from each other using reverse phase chromatography, and the individual fragments sequenced using standard protein sequencing equipment. The short pieces of internal amino acid sequence thus obtained are compared with the published oleosin protein sequences as described above.

Oil Bodies—Methods of Production

Methods of producing oil bodies are well known in the art. Typically, plants are grown and allowed to set seed using agricultural cultivation practices well known to a person skilled in the art. After harvesting the seed and, if desired, removal of material such as stones or seed hulls (de-hulling), by for example sieving or rinsing, and optionally drying of the seed, the seeds are subsequently processed by mechanical pressing, grinding or crushing. A liquid phase (e.g. water) may also be added prior to grinding of the seeds, which is known as wet milling and has been reported for seeds from a variety of plant species including: mustard (Aguilar et al., 1990, *Journal of Texture studies* 22: 59-84), soybean (U.S. Pat. No. 3,971,856; Carter et al., 1974, *J. Am. Oil Chem. Soc.* 51: 137141), peanut (U.S. Pat. Nos. 4,025,658; 4,362,759), cottonseed (Lawhon et al., 1977, *J. Am. Oil, Chem. Soc.* 63: 533-534) and coconut (Kumar et al., 1995, *INFORM* 6(11): 12171240). Following grinding, a homogenate is obtained which is filtrated. The filtrate may be subsequently centrifuged to extract the oil bodies with their associated proteins therefrom. The oil bodies may be subsequently washed, however, it is desirable that aggregates of oil bodies are dissociated as thoroughly as possible in order to ensure efficient removal of contaminants in the subsequent washing steps. The oil bodies may be washed by e.g. re-suspending them in a floatation solution of higher density (e.g. water, aqueous buffer) and centrifuged, again, separating the oil bodies and aqueous phases. This washing procedure is typically repeated between one and three times after which the oil bodies are deemed to be sufficiently free of contaminating soluble proteins as determined by gel electrophoresis (e.g. SDS-PAGE). Protocols for isolating oil bodies from oil seeds are available in WO 2012/110797; WO 98/53698; EP 1 007 554; Murphy & Cummins, 1989, *Phytochemistry* 28: 2063-2069; and Jacks et al., 1990, *JAOCS* 67: 353-361.

Oil Bodies—Proportion of the Product

Preferably the frozen confection product comprises at least 1 wt % (by weight of the product) oil bodies, more preferably at least 2.5 wt %, at least 5 wt %, at least 10 wt %, at least 12.5 wt %, at least 15 wt %, or even at least 17.5 wt % oil bodies.

Preferably the product comprises at most 50 wt % (by weight of the product) oil bodies, more preferably at most 40 wt %, at most 35 wt %, at most 30 wt %, at most 25 wt %, or even at most 20 wt % oil bodies.

Oil Bodies—Proportion of the Fat

At least 25 wt % of the fat (by weight of the total fat) is present as oil bodies. "Present as oil bodies" means that the fat in the ice cream comes from the oil in the oil bodies. For the avoidance of doubt, "by weight of the fat" means that the percent by weight (wt %) of the total fat in the product that is present as oil bodies is calculated as a proportion of the total fat in the product. For example:

if 100 g of the product contains 20 g of fat of which 15 g was oil from the oil bodies;

then the product contains 20 wt % fat (i.e. 20 g/100 g); and 75 wt % (15 g/20 g) of the fat is present as oil bodies.

Preferably at least 30 wt % of the fat (by weight of the total fat) is present as oil bodies, more preferably at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, at least 97.5 wt %, at least 98 wt %, at least 99 wt %, at least 99.5 wt %, at least 99.9 wt %, or even 100 wt % of the fat is present as oil bodies.

Fats and Oils

By fats and oils is meant triglycerides, which are esters derived from glycerol and three fatty acids. Fatty acids are a carboxylic acid with a long aliphatic chain, which is either saturated or unsaturated. Fatty acids differ by length, often categorized as short to very long. Short-chain fatty acids (SOFA) are fatty acids with aliphatic tails of five or fewer carbons (e.g. butyric acid). Medium-chain fatty acids (MCFA) are fatty acids with aliphatic tails of 6 to 12 carbons, which can form medium-chain triglycerides. Long-chain fatty acids (LCFA) are fatty acids with aliphatic tails of 13 to 21 carbons. Very long chain fatty acids (VLCFA) are fatty acids with aliphatic tails of 22 or more carbons.

Saturated fatty acids have no C=C double bonds. They have the general formula $CH_3(CH_2)_n COOH$. A non-exhaustive list of saturated fatty acids is provided in Table 1.

TABLE 1

Saturated fatty acids

| Common Name | Systematic Name | Structural Formula | Lipid Numbers |
|---|---|---|---|
| Butyric acid | Butanoic acid | $CH_3(CH_2)_2COOH$ | C4:0 |
| Valeric acid | Pentanoic acid | $CH_3(CH_2)_3COOH$ | C5:0 |
| Caproic acid | Hexanoic acid | $CH_3(CH_2)_4COOH$ | C6:0 |
| Enanthic acid | Heptanoic acid | $CH_3(CH_2)_5COOH$ | C7:0 |
| Caprylic acid | Octanoic acid | $CH_3(CH_2)_6COOH$ | C8:0 |
| Pelargonic acid | Nonanoic acid | $CH_3(CH_2)_7COOH$ | C9:0 |
| Capric acid | Decanoic acid | $CH_3(CH_2)_8COOH$ | C10:0 |
| Undecylic acid | Undecanoic acid | $CH_3(CH_2)_9COOH$ | C11:0 |
| Lauric acid | Dodecanoic acid | $CH_3(CH_2)_{10}COOH$ | C12:0 |
| Tridecylic acid | Tridecanoic acid | $CH_3(CH_2)_{11}COOH$ | C13:0 |
| Myristic acid | Tetradecanoic acid | $CH_3(CH_2)_{12}COOH$ | C14:0 |
| Pentadecylic acid | Pentadecanoic acid | $CH_3(CH_2)_{13}COOH$ | C15:0 |
| Palmitic acid | Hexadecanoic acid | $CH_3(CH_2)_{14}COOH$ | C16:0 |
| Margaric acid | Heptadecanoic acid | $CH_3(CH_2)_{15}COOH$ | C17:0 |
| Stearic acid | Octadecanoic acid | $CH_3(CH_2)_{16}COOH$ | C18:0 |
| Nonadecylic acid | Nonadecanoic acid | $CH_3(CH_2)_{17}COOH$ | C19:0 |
| Arachidic acid | Eicosanoic acid | $CH_3(CH_2)_{18}COOH$ | C20:0 |
| Heneicosylic acid | Heneicosanoic acid | $CH_3(CH_2)_{19}COOH$ | C21:0 |
| Behenic acid | Docosanoic acid | $CH_3(CH_2)_{20}COOH$ | C22:0 |
| Tricosylic acid | Tricosanoic acid | $CH_3(CH_2)_{21}COOH$ | C23:0 |
| Lignoceric acid | Tetracosanoic acid | $CH_3(CH_2)_{22}COOH$ | C24:0 |
| Pentacosylic acid | Pentacosanoic acid | $CH_3(CH_2)_{23}COOH$ | C25:0 |
| Cerotic acid | Hexacosanoic acid | $CH_3(CH_2)_{24}COOH$ | C26:0 |
| Heptacosylic acid | Heptacosanoic acid | $CH_3(CH_2)_{25}COOH$ | C27:0 |
| Montanic acid | Octacosanoic acid | $CH_3(CH_2)_{26}COOH$ | C28:0 |
| Nonacosylic acid | Nonacosanoic acid | $CH_3(CH_2)_{27}COOH$ | C29:0 |
| Melissic acid | Triacontanoic acid | $CH_3(CH_2)_{28}COOH$ | C30:0 |
| Hentriacontylic acid | Hentriacontanoic acid | $CH_3(CH_2)_{29}COOH$ | C31:0 |
| Lacceroic acid | Dotriacontanoic acid | $CH_3(CH_2)_{30}COOH$ | C32:0 |
| Psyllic acid | Tritriacontanoic acid | $CH_3(CH_2)_{31}COOH$ | C33:0 |
| Geddic acid | Tetratriacontanoic acid | $CH_3(CH_2)_{32}COOH$ | C34:0 |
| Ceroplastic acid | Pentatriacontanoic acid | $CH_3(CH_2)_{33}COOH$ | C35:0 |
| Hexatriacontylic acid | Hexatriacontanoic acid | $CH_3(CH_2)_{34}COOH$ | C36:0 |
| Heptatriacontanoic acid | Heptatriacontanoic acid | $CH_3(CH_2)_{35}COOH$ | C37:0 |
| Octatriacontanoic acid | Octatriacontanoic acid | $CH_3(CH_2)_{36}COOH$ | C38:0 |
| Nonatriacontanoic acid | Nonatriacontanoic acid | $CH_3(CH_2)_{37}COOH$ | C39:0 |
| Tetracontanoic acid | Tetracontanoic acid | $CH_3(CH_2)_{38}COOH$ | C40:0 |

Unsaturated fatty acids have one or more C=C double bonds which can give either cis or trans isomers. Monounsaturated fatty acids (MUFAs, monounsaturated fats) are fatty acids that have one double bond in the fatty acid chain with all of the remainder carbon atoms being single-bonded. Polyunsaturated fatty acids (PUFAs) have more than one double bond.

TABLE 2

Unsaturated fatty acids

| ω-n | Common Name | Lipid Numbers | $\Delta^n$ | Structural Formula |
|---|---|---|---|---|
| ω-3 | α-Linolenic acid | C18:3 | $\Delta^{9, 12, 15}$ | $CH_3CH_2CH=CHCH_2$ $CH=CHCH_2CH=CH(CH_2)_7$ $COOH$ |
| ω-3 | Stearidonic acid | C18:4 | $\Delta^{8, 9, 12, 15}$ | $CH_3CH_2CH=CHCH_2CH=CH$ $CH_2CH=CHCH_2$ $CH=CH(CH_2)_4COOH$ |
| ω-3 | Eicosapentaenoic acid | C20:5 | $\Delta^{5, 8, 11, 14, 17}$ | $CH_3CH_2CH=CHCH_2$ $CH=CHCH_2CH=CHCH_2CH=CH$ $CH_2CH=CH(CH_2)_3COOH$ |
| ω-3 | Docosahexaenoic acid | C22:6 | $\Delta^{4, 7, 10, 13, 16, 19}$ | $CH_3CH_2CH=CHCH_2$ $CH=CHCH_2CH=CHCH_2CH=CH$ $CH_2CH=CHCH_2CH=CH(CH_2)_2COOH$ |
| ω-6 | Linoleic acid | C18:2 | $\Delta^{9, 12}$ | $CH_3(CH_2)_4CH=CHCH_2$ $CH=CH(CH_2)_7COOH$ |
| ω-6 | Linolelaidic acid | C18:2 | | $CH_3(CH_2)_4CH=CHCH_2$ $CH=CH(CH_2)_7COOH$ |
| ω-6 | γ-Linolenic acid | C18:3 | $\Delta^{8, 9, 12}$ | $CH_3(CH_2)_4CH=CHCH_2$ $CH=CHCH_2CH=CH(CH_2)_4COOH$ |
| ω-6 | Dihomo-γ-linolenic acid | C20:3 | $\Delta^{8, 11, 14}$ | $CH_3(CH_2)_4CH=CHCH_2$ $CH=CHCH_2CH=CH(CH_2)_6COOH$ |
| ω-6 | Arachidonic acid | C20:4 | $\Delta^{5, 8, 11, 14}$ | $CH_3(CH_2)_4CH=CHCH_2CH=CH$ $CH_2CH=CHCH_2CH=CH(CH_2)_3COOH$ |
| ω-6 | Docosatetraenoic acid | C22:4 | $\Delta^{7, 10, 13, 16}$ | $CH_3(CH_2)_4CH=CHCH_2CH=CHCH_2$ $CH=CHCH_2CH=CH(CH_2)_5COOH$ |
| ω-7 | Palmitoleic acid | C16:1 | $\Delta^9$ | $CH_3(CH_2)_5CH=CH(CH_2)_7COOH$ |
| ω-7 | Vaccenic acid | C18:1 | $\Delta^{11}$ | $CH_3(CH_2)_5CH=CH(CH_2)_9COOH$ |
| ω-7 | Paullinic acid | C20:1 | $\Delta^{13}$ | $CH_3(CH_2)_5CH=CH(CH_2)_{11}COOH$ |
| ω-9 | Oleic acid | C18:1 | $\Delta^9$ | $CH_3(CH_2)_7CH=CH(CH_2)_7COOH$ |
| ω-9 | Elaidic acid | C18:1 | $\Delta^9$ | $CH_3(CH_2)_7CH=CH(CH_2)_7COOH$ |
| ω-9 | Gondoic acid | C20:1 | $\Delta^{11}$ | $CH_3(CH_2)_7CH=CH(CH_2)_9COOH$ |
| ω-9 | Erucic acid | C22:1 | $\Delta^{13}$ | $CH_3(CH_2)_7CH=CH(CH_2)_{11}COOH$ |
| ω-9 | Nervonic acid | C24:1 | $\Delta^{15}$ | $CH_3(CH_2)_7CH=CH(CH_2)_{13}COOH$ |
| ω-9 | Mead acid | C20:3 | $\Delta^{5, 8, 11}$ | $CH_3(CH_2)_7CH=CHCH_2CH=CH$ $CH_2CH=CH(CH_2)_3COOH$ |

In the present invention, the positions of the double bonds in a fatty acid chain are indicated using the ω-n notation (Lipid Numbers). Thus, in an 18 carbon fatty acid, a double bond between ω-7 and ω-6 is reported as ω-6 (or omega-6) counting from the —$CH_3$ end. A non-exhaustive list of unsaturated fatty acids is provided in Table 2.

As will be appreciated, different fats and oils contain different types and amounts of fatty acids and therefore have different properties. This is equally true of the oils contained in oils bodies in which the fatty acid profiles of the oils is dependent on the source of the oil. For example, oil from the oil bodies of sunflower seeds will have a different fatty acid profile to oil from the oil bodies of cottonseeds. Moreover, fatty acid profiles of the oils in oils bodies even varies between different species of the same seeds—for example as shown below, between different sunflower species.

The present invention has surprisingly found that if oil bodies contain oil with specific properties then they can actually be used to improve the meltdown performance of a frozen confection. This is particularly surprising because the oil is contained within the oil body structure and would therefore not be expected to play a physical role within the micro- or macro-structure of the frozen confection product.

Iodine Values

In particular, the present inventors have found that if the oil in the oil bodies has an iodine value of less than 100 then improved meltdown is achieved. Preferably the iodine value is less than 95, less than 90, less than 85, less than 80, less than 75, less than 70, less than 65, less than 60, less than 55, less than 50, less than 45, less than 40, less than 35, less than 30, or even less than 25. Preferably the iodine value is greater than 5, greater than 10, greater than 15, or even greater than 20.

The iodine value is defined herein as the mass of iodine in grams that is consumed by 100 grams of a chemical substance, in this case the oil of an oil body. Iodine numbers are used to determine the amount of unsaturation in fatty acids because the of double bonds react with iodine compounds. The higher the iodine number, the more C=C bonds that are present. For example, coconut oil is very saturated, which means it has a lower iodine value than linseed oil which is highly unsaturated. Sunflower oil typically has an iodine value of from 118 to 144. Iodine value can be determined experimentally using techniques known to the person skilled in the art, for example International Standard ISO 3961: Animal and Vegetable fats and oils—Determination of iodine value. Iodine value can also be calculated from the fatty acid compositional data as described in ISO 3961: Annex A.

Melting Properties

In an alternative aspect to the invention, the present invention has found that if the oil in the oil bodies has particular melting properties, then improved meltdown is achieved. Again, this is surprising because the oil is contained within the oil body structure and would therefore not be expected to play a physical role within the micro- or macro-structure of the frozen confection product.

In particular, the present inventors have found that if the oil in the oil bodies has a melting peak, as determined by differential scanning calorimetry (DSC), between −20° C. to 5° C., then improved meltdown is achieved.

Preferably the lower end of the peak is at least −15° C., at least −10° C., at least −7.5° C., at least −5° C., at least −4° C., at least −3° C., at least −2° C., at least −1° C., or even at least 0° C. Preferably the upper end of the peak is at most 4° C., at most 3° C., at most 2° C., or even at most 1° C.

The melting peak can be determined by DSC using techniques known to the person skilled in the art such as that exemplified below.

Fatty Acid Population

In an alternative aspect to the invention, the present invention has found that if the oil in the oil bodies has particular fatty acid population, then improved meltdown is achieved. Again, this is surprising because the oil is contained within the oil body structure and would therefore not be expected to play a physical role within the micro- or macro-structure of the frozen confection product.

C18:1 Fatty Acids

In particular, the present invention has found that if the oil in the oil bodies comprises at least 45 wt % C18:1 fatty acids, then improved meltdown is achieved.

Preferably the oil in the oil bodies comprises at least 50 wt % C18:1 fatty acids, at least 55 wt %, at least 60 wt %, at least 65 wt %, at least 70 wt %, or even at least 75 wt % C18:1 fatty acids. Preferably the oil in the oil bodies comprises at most 90 wt % C18:1 fatty acids, more preferably at most 80 wt %.

The C18:1 fatty acid may be selected from the group consisting of vaccenic acid, oleic acid, elaidic acid, 12-octadecenoic acid, petroselinic acid, or mixtures thereof. Preferably the C18:1 fatty acid is oleic acid.

The fatty acid population of an oil can be determined using gas chromatographic analysis of fatty acid methyl esters as exemplified below or as disclosed in Eder, 1995, *J. Chromatogr. B Biomed. Sci. Appl.* 671: 113-131.

Stabilisers

Frozen confection products of the invention may also comprise stabilisers. Stabilisers that may be used include proteins such as gelatin; plant extrudates such as gum arabic, gum ghatti, gum karaya, gum tragacanth; seed gums such as locust bean gum, guar gum, psyllium seed gum, quince seed gum or tamarind seed gum; seaweed extracts such as agar, alganates, carrageenan or furcelleran; pectins such as low methoxyl or high methoxyl-type pectins; cellulose derivatives such as sodium carboxymethyl cellulose, microcrystalline cellulose, methyl and methylethyl celluloses, or hydroxylpropyl and hydroxypropylmethyl celluloses; and microbial gums such as dextran, xanthan or beta-1,3-glucan. Preferably, the stabiliser is selected from locust bean gum, kappa carrageenan, guar gum or mixtures thereof.

Preferably the frozen confection product comprises at least 0.05 wt % (by weight of the product) stabiliser, at least 0.1 wt %, at least 0.15 wt %, at least 0.2 wt %, or even at least 0.25 wt %. Preferably the frozen confection product comprises at most 1 wt % stabiliser, at most 0.9 wt %, at most 0.8 wt %, at most 0.7 wt %, at most 0.6 wt %, at most 0.5 wt %, or even at most 0.4 wt %.

Emulsifiers

Frozen confection products of the invention may also comprise an emulsifier. Examples of known emulsifiers include mono- and di-glycerides of saturated or unsaturated fatty acids (for example monoglyceryl palmitate), polyoxyethylene derivatives of hexahydric alcohols (usually sorbitol), glycols, glycol esters, polyglycerol esters, sorbitan esters, stearoyl lactylate, lactic acid esters, citric acid esters, acetylated monoglyceride, diacetyl tartaric acid esters, polyoxyethylene sorbitan esters, lecithin and egg yolk and mixtures thereof. Preferably the emulsifier is a mono-/di-glyceride of saturated fatty acids with a monoglyceride content of at least 40 percent.

Preferably the frozen confection product comprises at most 1 wt % (by weight of the product) emulsifier, at most 0.75 wt %, at most 0.5 wt %, at most 0.4 wt %, at most 0.3 wt %, at most 0.2 wt %, at most 0.1 wt %, at most 0.05 wt %, at most 0.025 wt %, at most 0.01 wt %, or even at most 0.001 wt %. Most preferably the frozen confection product comprises no emulsifier.

Non-Saccharide Sweetener

The frozen confection product optionally comprises non-saccharide sweetener. If used, the non-saccharide sweetener may be selected from the group consisting of: aspartame, saccharin, acesulfame K, alitame, thaumatin, cyclamate, glycyrrhizin, stevioside, neohesperidine, sucralose, monellin, neotame, hydrogenated starch hydrosylate, eythritol, arabitol, glycerol, xylitol, sorbitol, mannitol, lactitol, maltitol, isomalt, and palatinit.

If non-saccharide sweetener is used, the frozen confection product preferably comprises at least 0.02 wt % (by weight of the product), at least 0.03 wt %, at least 0.04 wt %, at least 0.05 wt %, at least 0.10 wt %, at least 0.15 wt %, at least 0.20 wt %, at least 0.25 wt %, or even at least 0.50 wt % non-saccharide sweetener. Preferably the frozen confection product comprises at most 2.5 wt % (by weight of the product), at most 2 wt %, or even at most 1 wt % non-saccharide sweetener.

In addition, the frozen confection product may comprise flavouring and/or colouring. Typical flavourings include mint, vanilla, chocolate, coffee, or fruit flavours. Preferably, the flavouring or colouring will be present at a level of less than 1 wt % of the composition. Pieces of nut, chocolate, ginger, biscuit, fruit, fruit puree, or other ingredients or additives commonly added to ice cream or other ice confections may also be included.

Balance Water

The balance (to 100 wt %) of the remaining ingredients may be water, preferably the balance is water.

Overrun

Overrun is defined by the formula:

$$\text{overrun (\%)} = (\text{weight of mix} - \text{weight of aerated product})/(\text{weight of aerated product}) \times 100,$$

where the weights refer to a fixed volume of mix or product. Overrun is measured at atmospheric pressure.

The frozen confection product may be aerated or unaerated. By unaerated is meant an overrun of less than 20%, preferably less than 10%. An unaerated frozen confection product is not subjected to deliberate steps such as whipping to increase the gas content. Nonetheless, it will be appreciated that during the preparation of unaerated frozen confection products, low levels of gas, such as air, may be incorporated in the product. Preferably the frozen confection product is aerated. Aerated frozen confection products have an overrun of more than 20%, preferably more than 50%, or more than 75%. Preferably the frozen confection has an overrun of less than 200%, less than 150%, or less than 120%.

Premix

As set out above, frozen confections, in particular ice creams, are prepared from a premix. In the context of the present invention the premix refers to the mixture of the ingredients which make up the frozen confection compositions prior to freezing.

The present invention therefore provides a premix for preparing a frozen confection product comprising oil bodies and from 2 to 35 wt % (by weight of the premix) total fat;

at most 15 wt % (by weight of the premix) protein; and from 5 to 40 wt % (by weight of the premix) sugars;
wherein at least 25 wt % of the fat (by weight of the total fat) is present as oil bodies; and wherein the oil in the oil bodies has an iodine value of less than 100 and comprises at least 45 wt % C18:1 fatty acids.

All the foregoing definitions, parameters, ranges, and ingredients listed in relation to the frozen confection product of the first aspect apply mutatis mutandis to the premix of the second aspect.

Preferably the premix is an ice cream premix.

Process

In a third aspect, the present invention provides a process for the preparation of the product of the first aspect by combining the ingredients of the premix of the second aspect and freezing the premix.

Unless otherwise specified, numerical ranges expressed in the format "from x to y" are understood to include x and y. In specifying any range of values or amounts, any particular upper value or amount can be associated with any particular lower value or amount. Except in the examples and comparative experiments, or where otherwise explicitly indicated, all numbers are to be understood as modified by the word "about". All percentages and ratios contained herein are calculated by weight unless otherwise indicated. As used herein, the indefinite article "a" or "an" and its corresponding definite article "the" means at least one, or one or more, unless specified otherwise.

The various features of the present invention referred to in individual sections above apply, as appropriate, to other sections mutatis mutandis. Consequently features specified in one section may be combined with features specified in other sections as appropriate. Any section headings are added for convenience only, and are not intended to limit the disclosure in any way. The invention is not limited to the embodiments illustrated in the drawings. The examples are intended to illustrate the invention and are not intended to limit the invention to those examples per se.

FIGURES

EXAMPLES

Figure 1:
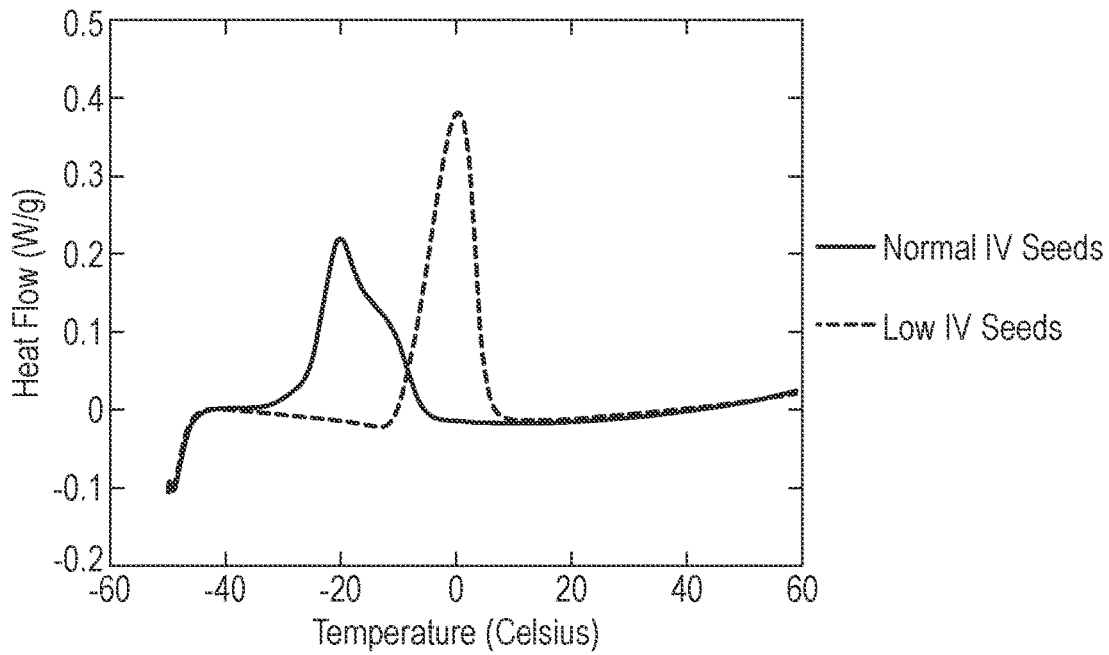
FIG. 1 shows the DSC melting peaks for oil bodies obtained from Low IV seeds and Normal IV seeds.

Sources of Oil Bodies
Sunflower seeds were obtained as follows:
Low Iodine Value sunflower seeds "Low IV seeds"
High oleic sunflower seeds from C. Thywissen GmbH
Normal Iodine Value sunflower seeds "Normal IV seeds"
High linoleic sunflower seeds from C. Thywissen GmbH Oil Body Extraction Method
The Low IV seeds and the Normal IV seeds were separately subjected to the following protocol to obtain Low IV and Normal IV oil bodies, respectively.

1. Pre-Soaking

Sunflower seeds (1 kg) were placed in a large plastic tub and 0.2 M sodium bicarbonate (NaHCO$_3$) solution pH 8.5 was added until the seeds were all immersed. About 2.5 litres of buffer was required. The bucket was placed in a chill room at about +5° C. and the seeds left to soak overnight.

2. Preparation of Crude Oil Bodies

The seeds were drained by pouring the excess buffer through a 2 mm aperture sieve. The weight of the wet seeds was 1500 g. 200 g portions of wet seeds were taken and weighed into a 2 litre stainless steel Waring Blender jug. 800 g of fresh 0.2 M sodium bicarbonate (NaHCO$_3$) solution was added. The mixture was ground in the Waring Blender (Waring Blender HGB26EK, Model HGB25KI) for 90 seconds. The resulting slurry (a thick paste) was then poured onto a double layer of cheesecloth that was laid over a 200 mm diameter stainless steel sieve (100 μm aperture) that was supported by a large plastic funnel placed on a 5 litre plastic beaker.

The cheesecloth was gathered into a bundle and squeezed hard by hand, over the sieve, to extract the maximum amount of serum. When no further serum could be extracted the cheesecloth bundle was undone and the solid residue within was discarded. This extraction procedure was repeated a further six times (seven extractions in total) to give enough serum to be able to fill six 1 litre centrifuge tubes. The serum was mixed with a large plastic spoon to give an even dispersion before being poured into the six centrifuge tubes. The weights of each tube were matched by adding or removing the appropriate amount of serum. The tubes were placed in a Sorvall RC3C centrifuge fitted with a H6000 swing-arm rotor and spun at 4000 rpm for 45 minutes with the centrifuge set to +4° C.

After spinning the uppermost cream layer, the oil body "pad", was separated from the serum and sediment by cutting the oil body pad with a stainless steel spatula and then pouring the tube contents onto a fine (100 μm aperture) sieve that was supported by a large plastic funnel over a 5 litre beaker. The oil body pad material was then carefully tipped and scraped off the sieve, using a flat bladed plastic spatula, directly into a 1.2 litre glass Waring Blender jug. The filtered serum and the small amount of sediment in the bottom of the centrifuge tubes were discarded.

3. First Wash

The oil body pad was collected from the two tubes. Fresh 0.2 M sodium bicarbonate buffer was added to the Waring Blender jug to make up the total weight of the contents to 900 g. The oil body material was dispersed by gently mixing in the blender (Waring Laboratory Blender LB20E, variable speed, Model LB20EG) for about two minutes, using a very low speed initially and then gradually increasing the speed, but only to a setting of about 3 (maximum setting is 12) until the mixture appeared uniform and with no obvious lumps present. The mixture was poured into a clean centrifuge tube.

The remaining tubes were emptied, in pairs, in a similar fashion and the resulting oil body material re-suspended as described above. The weights of the three resulting centrifuge tubes of oil body suspensions were balanced by transferring appropriate volumes of the suspensions between the three tubes. They were then spun at 4,000 rpm for 45 minutes as described above. The oil body pads were separated off using the same method as described above.

4. Second Wash

The oil body pad from each centrifuge tube was washed a second time by adding fresh 0.2 M sodium bicarbonate buffer to give a total weight of 900 g. The oil bodies were re-suspended using the Blender as describe above. The three centrifuge tubes were spun at 4,000 rpm for 45 minutes. The oil body pads were separated as described previously.

5. Third Wash

The oil body pad from each centrifuge tube was washed a third time by adding fresh 20% sucrose solution to give a total weight of 900 g. The oil bodies were re-suspended using the Blender as described above. The three tubes of oil body mixture were spun at 4,000 rpm for 45 minutes. The oil bodies were stored in a fridge until used in making an ice cream mix.

Analysis of Oil Bodies

Abbreviations

CN: Carbon Number
DAGs: Diacylglycerides
FFAs: Free Fatty Acids
MAGs: Monoacylglycerides
FAME: Fatty Acid Methyl Esters
TAGs: Triacylglycerides
MDT: mono-, di-, tri-glyceride Fatty Acid Methyl Esters Analysis The analysis of the fatty acid composition of the oil/fat in the seeds was performed using a combination of ISO methods. Lipids were extracted from the seeds using ISO method 17059 (2007): "*Oilseeds—Extraction of oil and preparation of methyl esters of triglyceride fatty acids for analysis by gas chromatography (Rapid method)*". Modifications were made to this method at detail level to match the amount of the seeds available and the expected oil levels. Two grams of seeds were ground. These were extracted with 150 ml light petroleum ether (boiling point range 80-100° C.) for 3 hours under stirring. The extract was filtered through a paper filter. The solvent was removed at 60° C. Methyl esters were prepared for the extracted lipids using ISO method 5509 (2000): "*Animal and vegetable fats and oils—Preparation of methylesters of fatty acids*" using trimethylsulfonium hydroxide as the transesterification reagent. The fatty acid methyl ester composition was finally analysed using ISO method 12966-4 (2015) "*Animal and vegetable fats and oils—Gas chromatography of fatty acid methyl esters—Part 4: Determination by capillary gas chromatography*". Because no cis/trans FAME information was needed, a CP-Wax 52CB capillary GC column of 10 m, 100 μm internal diameter and 0.2 μm film thickness was used.

Fatty Acid Methyl Esters Composition

The results in Table 3 provide the relative composition of the oils extracted from the seeds expressed as the fatty acid content.

TABLE 3

Fatty Acid Methyl Esters composition

| Fatty Acid ID | Potential Fatty Acid name(s) | Lipids from Low IV seeds | Lipids from Normal IV seeds |
|---|---|---|---|
| C14:0 | Myristic acid | 0.04 | 0.09 |
| C15:0 | Pentadecylic acid | 0.03 | 0.01 |
| C16:0 | Palmitic acid | 4.31 | 6.32 |
| C16:1 | 4-Hexadecenoic Sapienic Palmitoleic Palmitovaccenic | 0.17 | 0.15 |
| C17:0 | Margaric acid | 0.05 | 0.00 |
| C17:1 | Heptadecenoic acid | 0.07 | 0.02 |
| C18:0 | Stearic acid | 3.56 | 3.44 |
| C18:1 | Vaccenic acid (trans) Oleic acid Elaidic acid (trans) 12-Octadecenoic Petroselinic | 76.03 | 33.68 |
| C18:2 | e.g. Linoleic acid Linolelaidic acid (trans) Rumenic | 13.45 | 54.15 |
| C18:3 | e.g. α-Linolenic acid | 0.13 | 0.05 |

TABLE 3-continued

Fatty Acid Methyl Esters composition

| Fatty Acid ID | Potential Fatty Acid name(s) | Lipids from Low IV seeds | Lipids from Normal IV seeds |
|---|---|---|---|
| | γ-Linolenic acid α-Eleostearic β-Eleostearic Punicic 7,10,13-Octadecatrienoic Calendic Pinolenic | | |
| C20:0 | Arachidic acid | 0.30 | 0.23 |
| C20:onv. | n/a | 0.31 | 0.55 |
| C22:0 | Behenic acid | 0.98 | 0.69 |
| C22:onv. | n/a | 0.14 | 0.17 |
| C24:0 | Lignoceric acid | 0.32 | 0.18 |
| C24:onv. | n/a | | |
| Unknowns | n/a | 0.11 | 0.25 |

Entries denoted ":onv" relate to unsaturated fatty acids for which the chain length could be determined but the number of double bonds could not be determined.

The IV of the oils in the oil bodies were calculated using ISO 3961: Annex A and were determined to be:
Low IV Seeds: IV=89
Normal IV Seeds: IV=123

Differential Scanning Calorimetry

Differential scanning calorimetry (DSC) was carried out on the Low IV seeds and the Normal IV seeds.

DSC thermograms were recorded as follows: Seeds were cut into small (~2 mm) pieces and 2-3 pieces placed in stainless steel DSC pans. Each sample was then placed in a Perkin-Elmer Diamond DSC, with an empty pan as reference, and cooled to −50° C. at 5 degrees per minute, then held at −50° C. for 20 minutes to ensure solidification of the oil. The sample was then heated to 60° C. at 5 degrees per minute.

The results of the DSC analysis of the samples are shown in FIG. 1. It can be seen that the Low IV OB seeds have a significantly higher and distinct melting peak from −14° C. to +5° C. with a peak at 0° C. In contrast, the Normal IV sunflower seeds have a much lower melting peak at about −20° C.

Preparation of Frozen Confection Products

Frozen Confection Formulations

Frozen confection products were prepared according to the formulation described in Table 4. For the sake of clarity, the total amount of sugars and fat are provided as follows:

Sugars=23.02 wt %, comprised of:
Sucrose 16.73 wt %, Dextrose Monohydrate 0.41 wt %, Fructose 0.45 wt %, DE28 0.91 wt %, and
4.52 wt % Sucrose from the oil body preparation (because the formulation contained 22.6 wt % oil body preparation, of which 20% was sucrose).

Fat=17.72 wt %
Because the formulation contained 22.6 wt % oil body preparation, of which 20% was sucrose and 80% was oil bodies. However, oil bodies comprise 2 wt % protein (oleosin) leaving 17.72 wt % fat

TABLE 4

Frozen confection formulations

| Ingredient | Wt % |
|---|---|
| Sucrose | 16.73 |
| Dextrose Monohydrate | 0.41 |
| Fructose | 0.45 |
| DE28 | 0.91 |

TABLE 4-continued

Frozen confection formulations

| Ingredient | Wt % |
| --- | --- |
| Stabiliser | 0.30 |
| Oil Body Preparation | 22.6 |
| Water | Balance to 100 |

Preparation of Premix for Control Frozen Confection Product 1.7 kg of premix was prepared by dissolving appropriate amounts of the sugars and stabilisers in freshly boiled water. Oil bodies extracted from the Normal IV seeds were then added in a suitable amount as per Table 3, and the mixture homogenised using a Silverson L4R mixer at 3000 rpm with the mesh removed from the head for 1 min. The premix was stored in the fridge overnight.

Preparation of Premix for Test Frozen Confection Product

Premix was prepared as for the Control frozen confection product, but instead of oil bodies from Normal IV seeds, oil bodies from Low IV seeds were used. The premix was stored in a fridge overnight.

Preparation of Frozen Confection Products

Both the Control and the Test frozen confection products were prepared on a lab scale using a Taylor 104 benchtop batch freezer. Premix (approx. 1.5 L) was poured into the freezer to half fill the barrel, the mix was then frozen for approximately 20 min, until the temperature of the composition had reached −5° C. (tested by stopping the freezer and inserting a temperature probe into the dispensing port) by setting the freezer to auto mode and setting the timer appropriately. The frozen confection product was then dispensed into 250 ml pots by opening the dispensing port and setting the freezer to eject. The frozen confection products were then stored in a freezer at −25° C. prior to meltdown analysis.

Meltdown

Meltdowns were carried out on a lab scale. Frozen confection samples (5 cm×5 cm×3.5 cm) were cut and placed on a metal grate above a scale in an air-conditioned laboratory at 22° C. The mass of sample that had dripped through the grid was recorded every 10 seconds on computer and the room temperature noted. The percentage mass lost over time was then plotted so that samples can be compared. The results are shown in FIG. 2.

Figure 2:
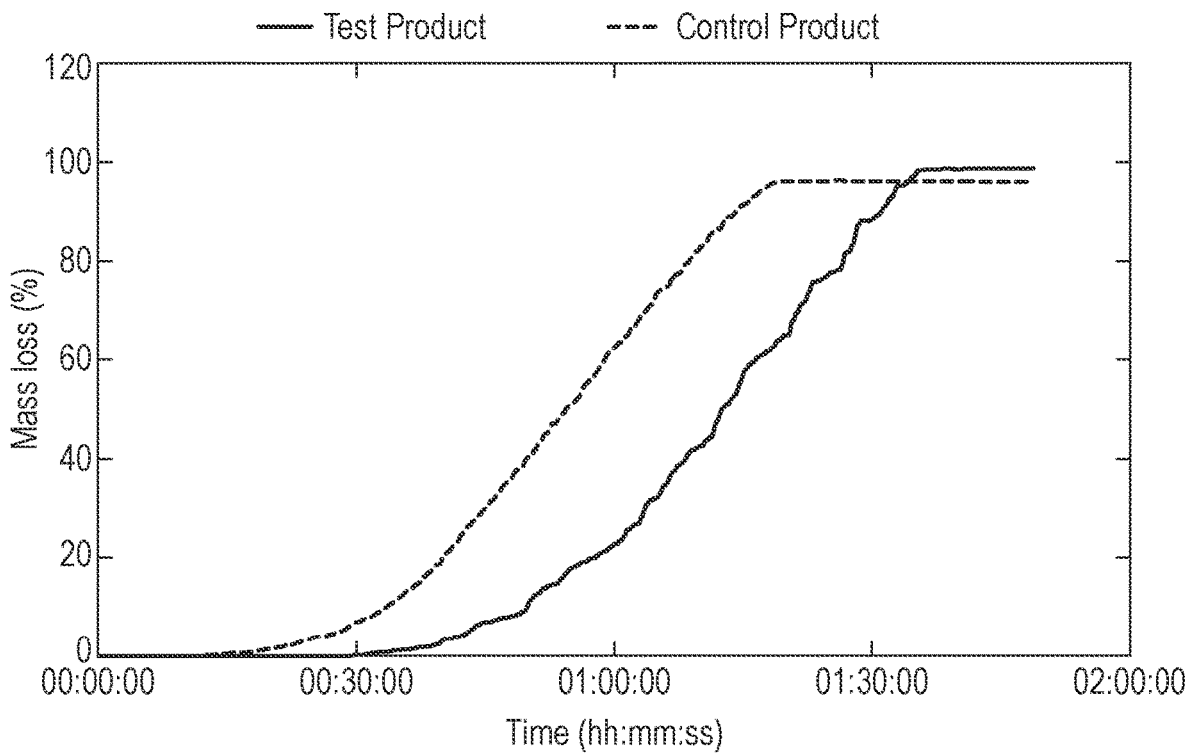
FIG. 2 shows the meltdown curves for the Control and Test frozen confection products.

As can be seen from FIG. 2, the Test frozen confection product prepared using the Low IV oil bodies had a remarkably improved meltdown profile when compared to the Control frozen confection product prepared using Normal IV oil bodies.

The invention claimed is:

1. A frozen confection product comprising oil bodies and from 2 to 35 wt % total fat;
   at most 15 wt % protein,
   from 5 to 40 Wt % sugars;
   wherein at least 25 wt % of the fat is present as oil bodies; and wherein the oil in the oil bodies has an iodine value of less than 100 and comprises at least 45 wt % C18:1 fatty acids, and wherein the oil bodies are derived from sunflower seeds.

2. The product according to claim 1 wherein the frozen confection product is an ice cream.

3. The product according to claim 1 wherein the frozen confection product comprises at least 1 wt % oil bodies.

4. The product according to claim 1 wherein the frozen confection product comprises at most 35 wt % oil bodies.

5. The product according to claim 1 wherein at least 30 wt % of the fat is present as oil bodies.

6. The product according to claim 1 wherein the iodine value is less than 95.

7. The product according to claim 1 wherein the oil in the oil bodies comprises at least 50 wt % C18:1 fatty acids.

8. The product according to claim 1 wherein the oil in the oil bodies has a melting peak between −20° C. and +5° C. as determined by differential scanning calorimetry.

9. The product according to claim 1 wherein the sugars are mono-saccharides and disaccharides.

10. The product according to claim 1 wherein the frozen confection product comprises 7.5 to 25 wt % total fat, 0.5 to 5 wt % protein and 15 to 30 wt % sugars.

* * * * *